May 17, 1932. J. B. CONTNER 1,859,128

MOVING PICTURE PROJECTOR

Filed April 6, 1929 2 Sheets-Sheet 1

J. Burgi Contner, INVENTOR

BY Victor J. Evans

ATTORNEY

May 17, 1932.　　J. B. CONTNER　　1,859,128
MOVING PICTURE PROJECTOR
Filed April 6, 1929　　2 Sheets-Sheet 2
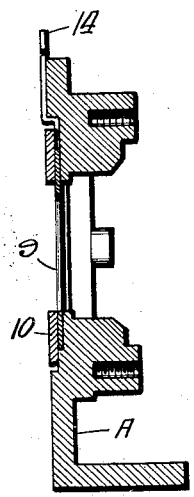
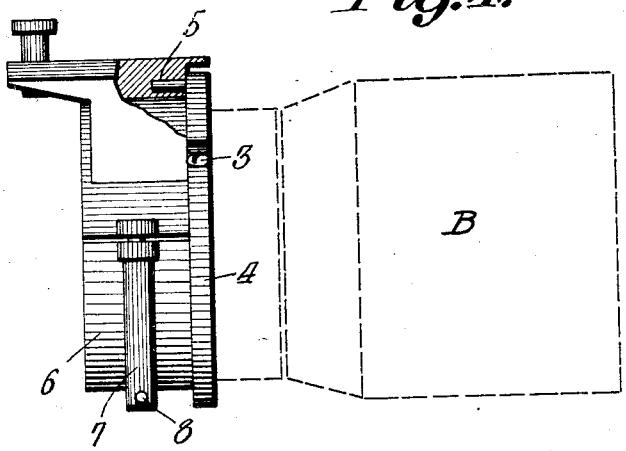
Fig.4.
Fig.5.
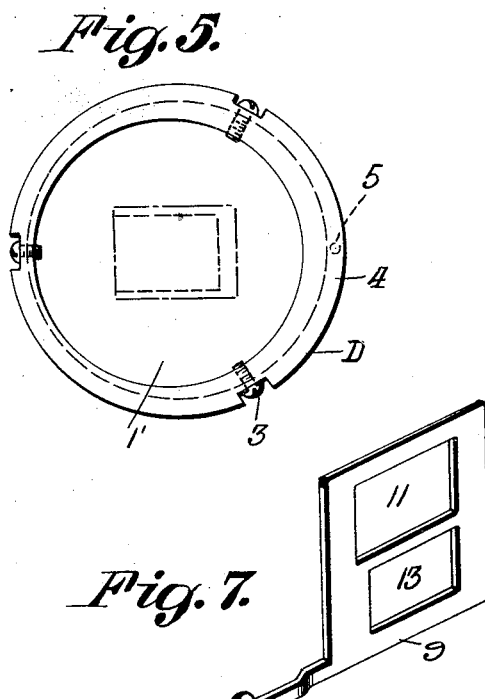
Fig.6.
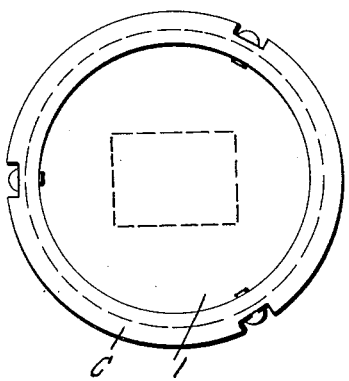
Fig.7.
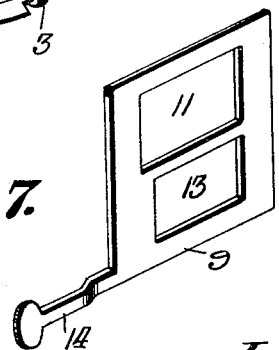
J. Burgi Contner, INVENTOR
BY Victor J. Evans
ATTORNEY Patented May 17, 1932

1,859,128

UNITED STATES PATENT OFFICE

J. BURGI CONTNER, OF LAKELAND, FLORIDA

MOVING PICTURE PROJECTOR

Application filed April 6, 1929. Serial No. 353,105.

This invention relates to improvements in projecting machines for moving pictures, the general object of the invention being to provide means whereby the machine can be easily and quickly changed from a machine for use with ordinary films to use with the films having sound grooves on a part thereof for use with talking movies.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 4 is a similar view, but the view being taken at rightangles to Figure 3.

Figure 5 is a view showing how the eccentric lens cooperates with the small opening in the slide.

Figure 6 is a view showing how the concentric lens cooperates with the large opening in the slide.

Figure 7 is a view of the slide.

Figure 1:
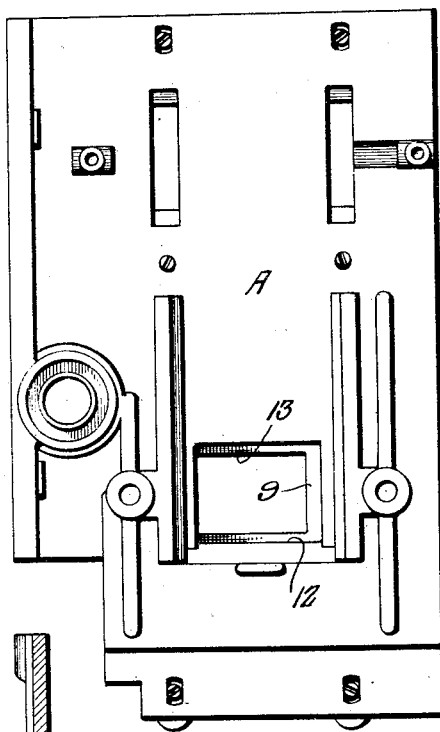
Figure 1 is a view of one face of the film trap.
Figure 2:
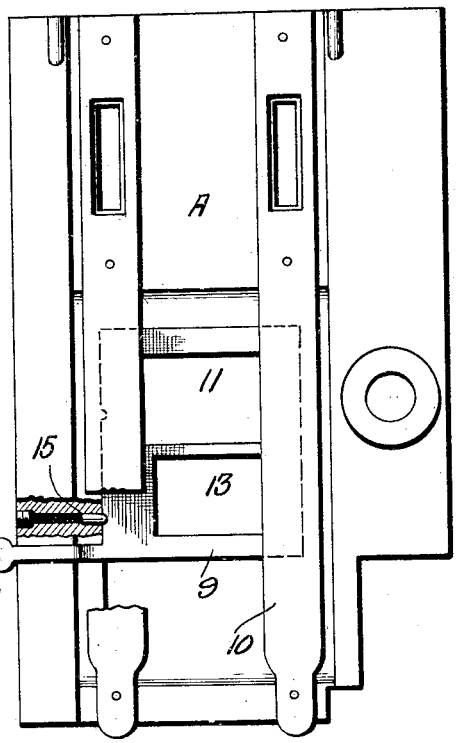
Figure 2 is a view of the opposite face thereof, with parts in section.
Figure 2:
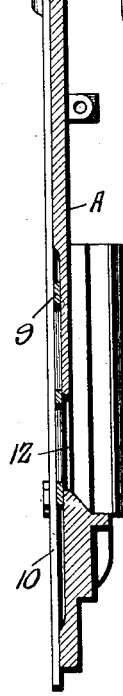
Figure 3:
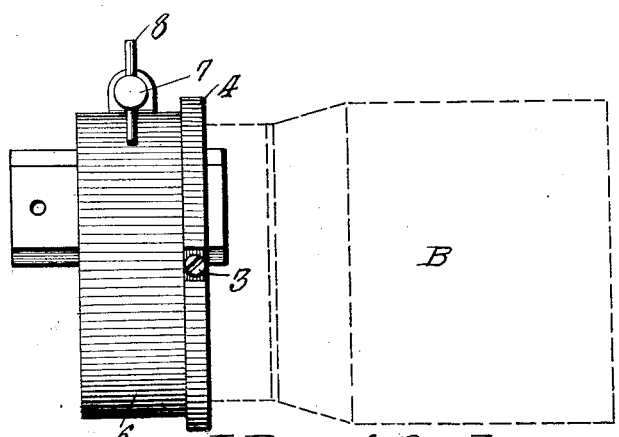
Figure 3 is a view showing the relative positions of the trap and lens adapter, parts of the trap being shown in section.

In these drawings, the letter A indicates the film trap, the letter B the carrier for the projection lens and the letters C and D indicate the adapters, the adapter C having a concentrically arranged opening therein for receiving a lens 1 and the adapter D having an eccentric opening therein for receiving a lens 1'. Each lens is held in its adapter by the set screws 3 and each adapter is of cylindrical shape with a flange 4 at its front end which carries a rearwardly extending pin 4' for engaging a hole 5 in the adapter clamp 6. This clamp is the regulation lens holder used on standard moving picture projectors, though it is machined to take the adapter. This clamp is tightened on the adapter by the turn screw 7 provided with the handle 8.

A plate 9 is slidably supported in the film trap by the guides 10 fastened to the trap, said plate being formed with an opening 11 which is of the same size as the opening 12 in the trap and it is also formed with an opening 13 of smaller size than the opening 11. This opening 11 is of the standard size for use with ordinary films, while the opening 13 is used with films having sound grooves on one edge thereof. This plate can be moved to place either of the openings 11 and 13 opposite the opening 12 by a handle 14 attached to the plate and the plate is held in either one of its two positions by the detent 15.

From the foregoing it will be seen that when the projecting device is used with films without sound grooves therein, the plate 9 is moved to a position to place the opening 11 opposite the opening 12 and the adapter C is placed in the clamp 6, but when a talking film is to be used, the plate 9 is positioned with the small opening 13 opposite the opening 12 and the eccentric adapter D placed in the clamp 6 so that the light rays are prevented from passing through that portion of the film which carries the sound grooves, due to the small size of the opening 13, and as the lens 1' is held in an offset position by the adapter D, the light rays are properly focussed through said small opening 13 so that the resultant picture on the screen will be of standard size. The lens 1' is of a wider angle than the lens 1 so that the image is magnified to a greater extent.

It will thus be seen that I have provided simple means whereby a projector can be used with standard films without the talking feature, or with films combining the talking feature.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In combination, a split sleeve-like adjustable adapter clamp of a projecting device, a lens carrier cooperating with the clamp, an adapter in the form of a cylindrical part having a flange at its outer end, the interior of the carrier being concentric, means for removably holding a lens in the adapter, and a pin on the flange to engage in the clamp when the cylindrical part fits therein.

In testimony whereof I affix my signature.

J. BURGI CONTNER.